March 3, 1942. J. LEVANAS 2,275,108
GREASE GUN
Filed Oct. 18, 1939
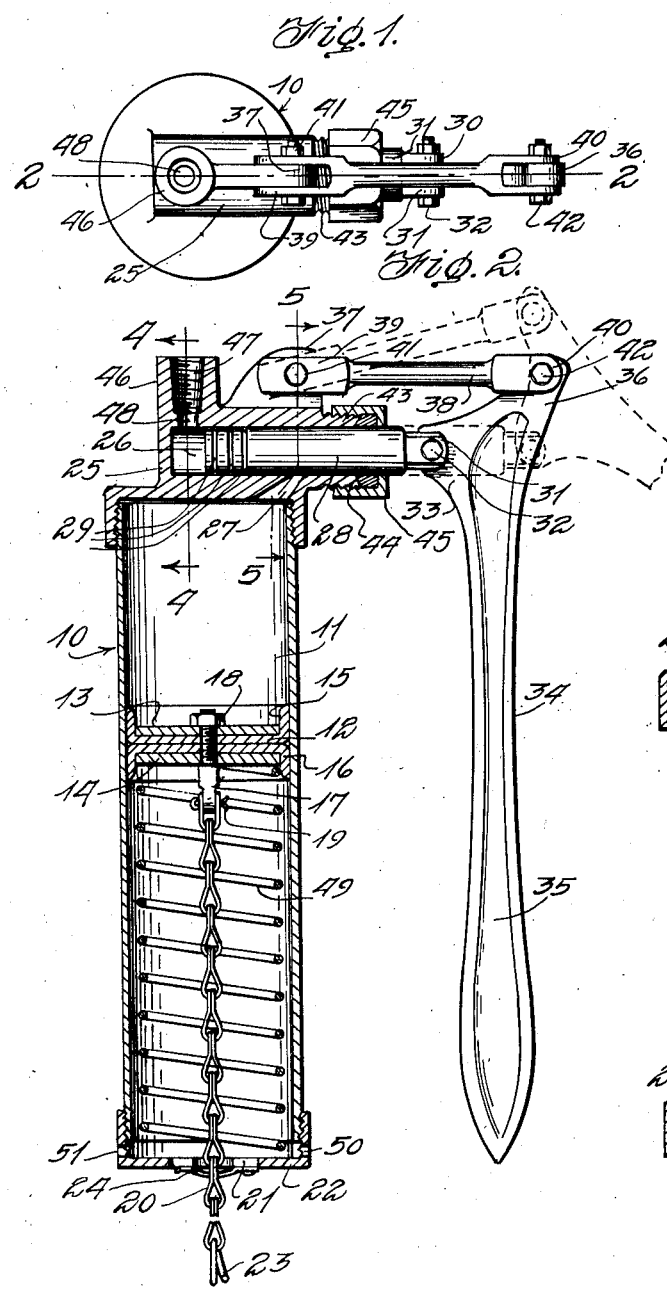
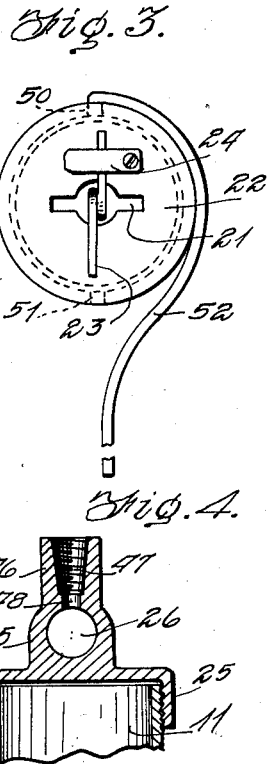
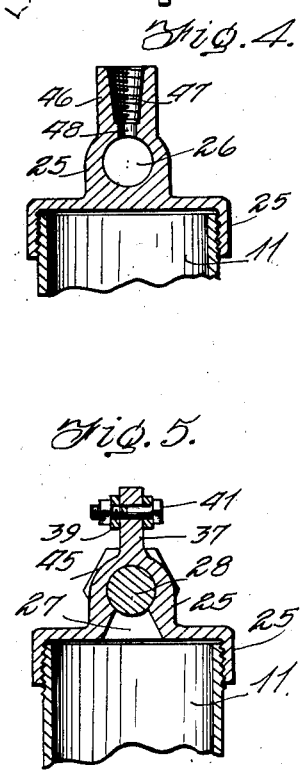
Inventor
JOHN LEVANAS,
By Leon Simon
Attorney Patented Mar. 3, 1942

2,275,108

UNITED STATES PATENT OFFICE 2,275,108

GREASE GUN

John Levanas, Cicero, Ill.

Application October 18, 1939, Serial No. 300,044

4 Claims. (Cl. 221—47.3)

The present invention relates to a grease gun. More particularly the present invention relates to a hand operated gun adapted to inject grease under a considerable pressure into a bearing provided with a fitting capable of retaining the grease within the bearing.

Although there has been provided in the past a considerable number of pressure guns of the type herein before mentioned, these guns were subject to a number of disadvantages. They usually embodied a main storage chamber and a pressure operated cylinder connected by a plurality of passages which were provided with ball valves or other suitable means to prevent the rearward flow of grease. These valves were prone to wear out and stop up and were otherwise undesirable. The guns were also provided with a piston within the pressure cylinder that was not grease tight and in many instances developed leaks about the piston actuating member. The piston operating arm in guns of this type was not guided in its movement and in many instances the play which developed was responsible for undue piston wear.

It is one of the objects of the present invention therefore to provide a grease gun which is extremely sturdy and is capable of long and continued use without deleterious effect.

Another object of the present invention is to provide a grease gun which is free from check valves.

A third object of the present invention is to provide a piston for the actuating cylinder of a grease gun having a series of grooves in its surface to prevent the escape of pressure and grease.

A fourth object of the present invention is to provide a grease gun having a guided operating handle. A fifth object of the present invention is to provide an unobstructed port of tapering cross section which will feed grease more easily from the storage chamber of a grease gun into the pressure cylinder.

A sixth object of the present invention is to provide an offset pressure cylinder which is mounted transversely to the storage chamber and extends over the edge thereof to provide a mounting for a packing gland nut.

A seventh object is to provide a packing gland about the end of the piston and pressure cylinder to prevent leakage of grease.

An eighth object is to provide a plunger operating chain for plunger of a grease gun storage chamber which is adapted to be used as a measure of the grease contained therein.

A ninth object is to provide a chain handle and a retaining clamp therefor which will prevent the chain from accidentally locking the storage chamber piston in position during operation.

Other objects and advantages will become apparent from the following description and drawing where:

Figure 1 is a top plan view of a grease gun according to the present invention.

Figure 2 is a vertical section of a grease gun taken on the line 2—2 of Figure 1.

Figure 3 is a bottom plan of the bottom cap and storage cylinder with a spanner wrench mounted thereon.

Figure 4 is a vertical section taken on the line 4—4 of Figure 2.

Figure 5 is a vertical section on the line 5—5 of Fig. 2.

Referring to the drawing, a grease gun is indicated in general by the reference number 10. The gun 10 is provided with a storage chamber for grease 11 wherein is mounted for reciprocating motion a piston 12. The piston 12 comprises a pair of washers 13 and 14 which are adapted to clamp a pair of leather gaskets 15 and 16 together and maintain the same on an eye bolt 17. The eye bolt 17 has a shoulder thereon which fits against the lower washer 14. A nut 18 on the upper end of the eyebolt serves to draw the two washers 13 and 14 together. Threaded through an opening in the lower end of the eye bolt 17 is a cotter pin 19 which fastens the end of a chain 20 to the eyebolt. The chain 20 extends through a lock slot 21 in the lower cap 22 which is threadedly fitted on the lower end of the cylinder 11.

A handle is provided at the lower end of the chain 20 which is adapted to be held in position by a spring clamp 24. When held by the clamp it is to be noted that the chain 20 can not be locked into the small ends of the slot 21.

The clamp 24 thus comprises means to hold the chain out of locking position. When so held the chain is incapable of hindering the upward motion of the piston 12. It is to be noted that although the chain 20 is shown broken away in Figure 1, it is of such length that when the piston 12 is in its uppermost position a certain definite amount of chain projects through the slot 21, as for example an inch. The chain 20 therefore acts as an indicator for the position of the piston in the cylinder and hence of the quantity of grease therein.

Removably fastened as by a multiple thread to the upper end of the storage chamber or cylinder 11 is an upper cap which carries a transversely mounted pressure cylinder 26. The pressure cylinder 26 communicates as by a port 27 with the storage chamber 11. The port 27 is of a tapering cross section being larger at the storage cylinder end as shown in Figures 2 and 5. This shape of the port 27 facilitates the passage of grease from the storage chamber to the pressure cylinder 25. Fitted within the pressure cylinder 26 is a piston 28 provided at its forward end with a plurality of circumferential grooves 29. Preferably three of these grooves slanting rearwardly and inwardly are provided in the piston. The shape of these grooves provides a series of shoulders at their rear extremities. Grease entering the grooves 29 during the forward movement of the piston is therefore packed against the rear of the groove to provide a packing. This arrangement prevents the escape of pressure and grease past the piston 28. The rear end of the piston 28 carries a pair of spaced ears 30 and 31.

Mounted between the ears 30 and 31 as by a suitable bolt 32 is the forward portion 33 of a handle 34. The handle 34 is hollowed out at a central portion 35 in order to reduce the weight thereof. The extreme upper portion 36 of the handle 34 is linked as by a clevis member to a lug 37 carried on the upper cap or head 25 of the gun.

The clevis member 38 is provided with a pair of forked ends 39 and 40. The forked end 39 is adapted to slidably fit the lug 37 and the forked end 40 is adapted to slidably fit the upper portion 36 of the handle 34. The forked ends 39 and 40 are each fastened to the lug 39 and the upper portion 36 for pivotal sliding movement by the bolts 41 and 42 respectively. The forked end 39 of the clevis member 38 is relatively long and it is to be noted fits over and slidably rotates on the lug 37 over the greater part of its length. This cooperation of the forked end 39 and the lug 37 is effective to steady the movement of the piston 28 and the handle 34 since it prevents any twisting movements of the handle or piston. This not only insures more effective operation of the gun but also prevents undue wear.

It is to be noted that the pressure cylinder 26 is formed on the cap 25 transversely to the storage chamber 11 and that the rearward end of the cylinder 26 projects over the edge of the cap in a threaded portion 43. The circumferential end 44 of the portion 43 is beveled and cooperates with a nut 45 to form a packing gland. The gland thus formed comprises an additional means to the grooves 29 in preventing escape of pressure and/or grease from the cylinder 26.

The cap 25 is also provided with an upwardly extending cylindrical portion 46 which is provided with a threaded bore 47 communicating with the cylinder 26 adjacent the forward end thereof by means of the orifice 48. The threads in the bore 47 are preferably tapered as shown in Figures 2 and 4 of the drawing and are adapted to fit a suitable grease conveying flexible hose. The hose used is adapted to fit any suitable grease fitting as provided in the modern automotive lubricating system.

Referring once again to the cylinder 11 it will be noted that a spring 49 is mounted in the cylinder and bears at one end against the bottom surface of the washer 14 and at the other against the cap 22. The cap 22 is provided with a pair of openings 50 and 51 which are adapted to cooperate with a spanner wrench 52 as shown in Figure 3. The spanner wrench and the openings 50 and 51 serve as a means to unscrew the cap 22 in order to replace any part of the plunger 12 or for replacing the spring 49. The cap 22 may be provided with a multiple thread to facilitate removal of the same.

The operation of the grease gun according to the present invention, assuming that the piston 12 is in its uppermost position and the chamber 11 empty, is as follows:

The cap 25 is unscrewed (an operation which is facilitated by the multiple thread) and the open end of the cylinder or storage chamber 11 inserted into a suitable source of grease. The handle 23 is then grasped and the piston 12 pulled rearwardly in the cylinder 11 by means of the chain 20 and against the action of the spring 49. When the cylinder is full, the chain is locked into one of the small ends of the lock slot 21 and the cap 25 once again screwed onto the cylinder 11. The chain 20 is then unlocked and the handle 23 inserted into the clamp 24 to prevent any accidental locking action. The spring 49 will then force the piston 12 upwardly and grease will be fed through the slot 27 whenever the piston 28 is in a rearward position and uncovers the same.

Forward movements of the piston 28 by means of the handle 34 will force grease out of the cylinder 26 through the openings 48 and 47 into the lubricant conveying hose. Return of the grease to the gun will be prevented by the usual spring valve arrangement on the bearing fitting.

I claim:

1. In a grease gun including a storage chamber, a pressure chamber transversely positioned relative to one end of said storage chamber and projecting substantially beyond the periphery of said storage chamber, a piston fitted within the pressure chamber and capable of reciprocating motion forwardly and rearwardly within said pressure chamber, the rearward motion of said piston toward the periphery of said storage chamber constituting a suction stroke of said piston and the forward movement a pressure stroke, and a port opening at one of its ends into said storage chamber at a point adjacent the periphery thereof and slanting outwardly beyond the periphery of said storage chamber to its other end opening into said pressure chamber, said port having a relatively large cross sectional area at its storage chamber end and a relatively small area at its pressure chamber end to facilitate the passage of grease from the storage chamber to said pressure chamber, said pressure chamber extending substantially beyond the pressure chamber end of said port to permit a long suction stroke of said piston in said pressure chamber beyond the last-mentioned end of said port.

2. In a grease gun including a storage chamber, a pressure chamber transversely positioned relative to one end of said storage chamber and projecting substantially beyond the periphery of said storage chamber, a piston fitting within the pressure chamber and capable of reciprocating motion forwardly and rearwardly within said pressure chamber, the rearward motion of said piston toward the periphery of said storage chamber constituting a suction stroke of said piston and the forward movement a pressure stroke, a port opening at one of its ends into said storage chamber at a point adjacent the periphery thereof and slanting outwardly beyond the periphery of said storage chamber to its other end opening into said pressure chamber, said port having a relatively large cross sectional area at its storage chamber end and a relatively small area at its pressure chamber end to facilitate the passage of grease from the storage chamber to said pressure chamber, said pressure chamber extending substantially beyond the pressure chamber end of said port to permit a long suction stroke of said piston in said pressure chamber beyond the last mentioned end of said port, and a packing nut fitted around the rearward end of said pressure chamber and spaced therefrom to provide a packing gland beyond said rearward end.

3. In a grease gun including a storage chamber, a piston in said storage chamber, a chain extending from said piston, a cap for said storage chamber, a lock-slot in said cap adapted to cooperate with said chain and prevent movement thereof, a handle on said chain and means to fix the position of said handle at an angle to said slots so as to prevent entry of the chain into the slots.

4. In a grease gun including a storage chamber, a piston in said storage chamber, a chain extending from said piston, a cap for said storage chamber, a lock-slot in said cap adapted to cooperate with said chain and prevent movement thereof, a handle on said chain and a clamp carried by said cap adapted to fix the position of said handle to prevent entry of the chain into the lock-slot.

JOHN LEVANAS.